United States Patent [19]

Onagi

[11] Patent Number: 5,757,736
[45] Date of Patent: May 26, 1998

[54] METHOD OF AND APPARATUS FOR RECORDING INFORMATION TO MAGNETO OPTICAL DISC HAVING PLURAL RECORDING LAYERS

[75] Inventor: Nobuaki Onagi, Tsurugashima, Japan

[73] Assignee: Pioneer Electronic Corporation, Japan

[21] Appl. No.: 721,740

[22] Filed: Sep. 27, 1996

[30] Foreign Application Priority Data

Sep. 28, 1995 [JP] Japan ................................ 7-251639

[51] Int. Cl.$^6$ ........................................... G11B 11/00
[52] U.S. Cl. ........................................ 369/13; 369/116
[58] Field of Search ......................... 369/13, 275.3, 369/275.4, 124, 54, 59, 275.2, 275.1, 116, 112, 121–122; 360/59, 114; 365/122; 428/694 EC, 694 MM

[56] References Cited

U.S. PATENT DOCUMENTS 5,163,031  11/1992  Osato ................................. 369/13
5,168,482  12/1992  Arateini et al. .................... 369/13
5,239,524  8/1993   Sato et al. ......................... 369/13
5,458,987  10/1995  Sato et al. ...................... 369/13 X

*Primary Examiner*—Ali Neyzari
*Attorney, Agent, or Firm*—Nixon & Vanderhye

[57] ABSTRACT

The magneto optical disc is provided with at least first and second recording layers such that the record information is recorded to the first recording layer at a vertically magnetized state thereof and is also recorded to the second recording layer at a vertically magnetized state thereof. The information recording method of recording record information to the magneto optical disc is provided with the steps of: controlling an output power of a recording light; irradiating the recording light to the record position; and applying, while irradiating the recording light to the magneto optical disc, to the record position, an external magnetic field.

12 Claims, 13 Drawing Sheets

W : POINT OF INFLECTION

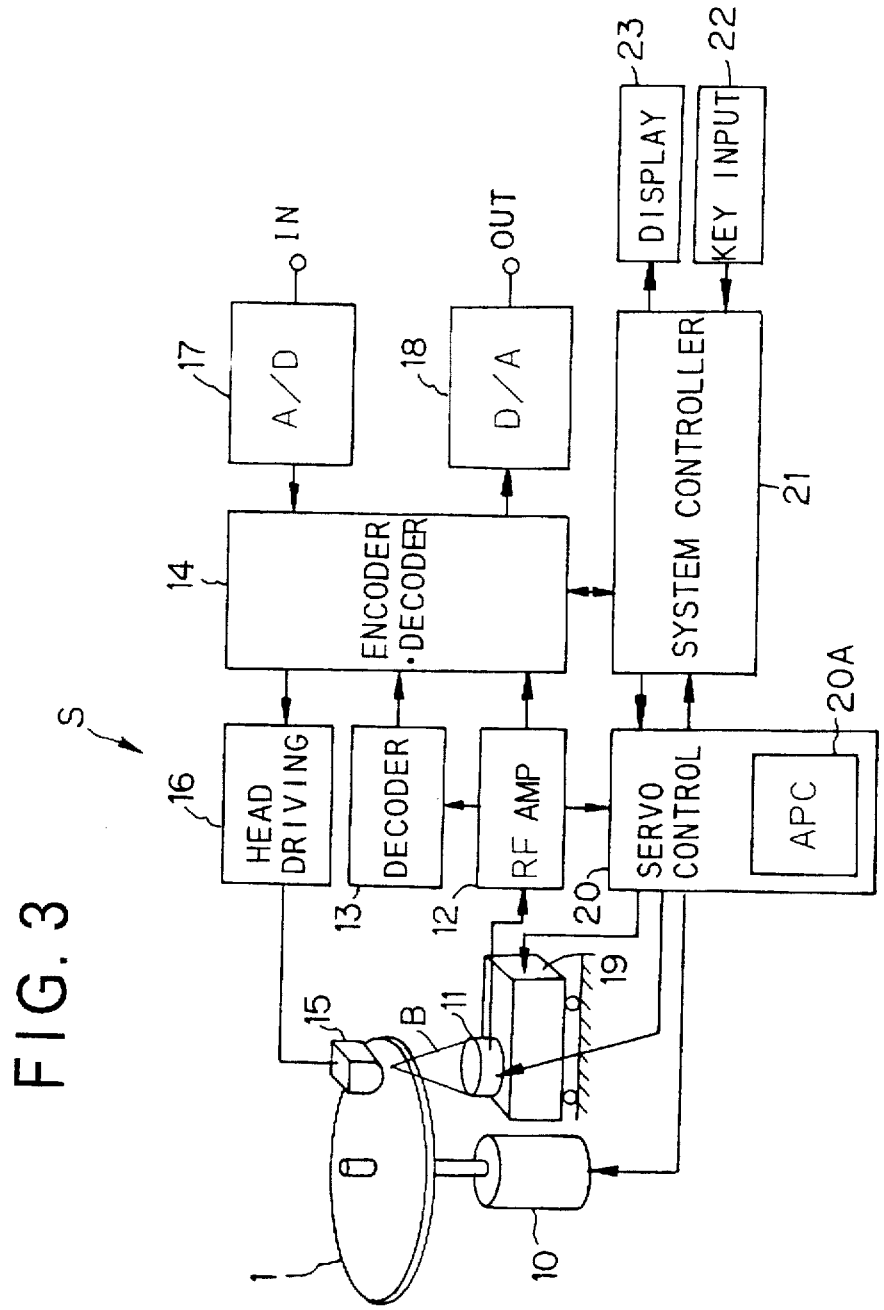

\* EACH ARROW INDICATES DIRECTION AND MAGNITUDE OF MAGNETIZATION

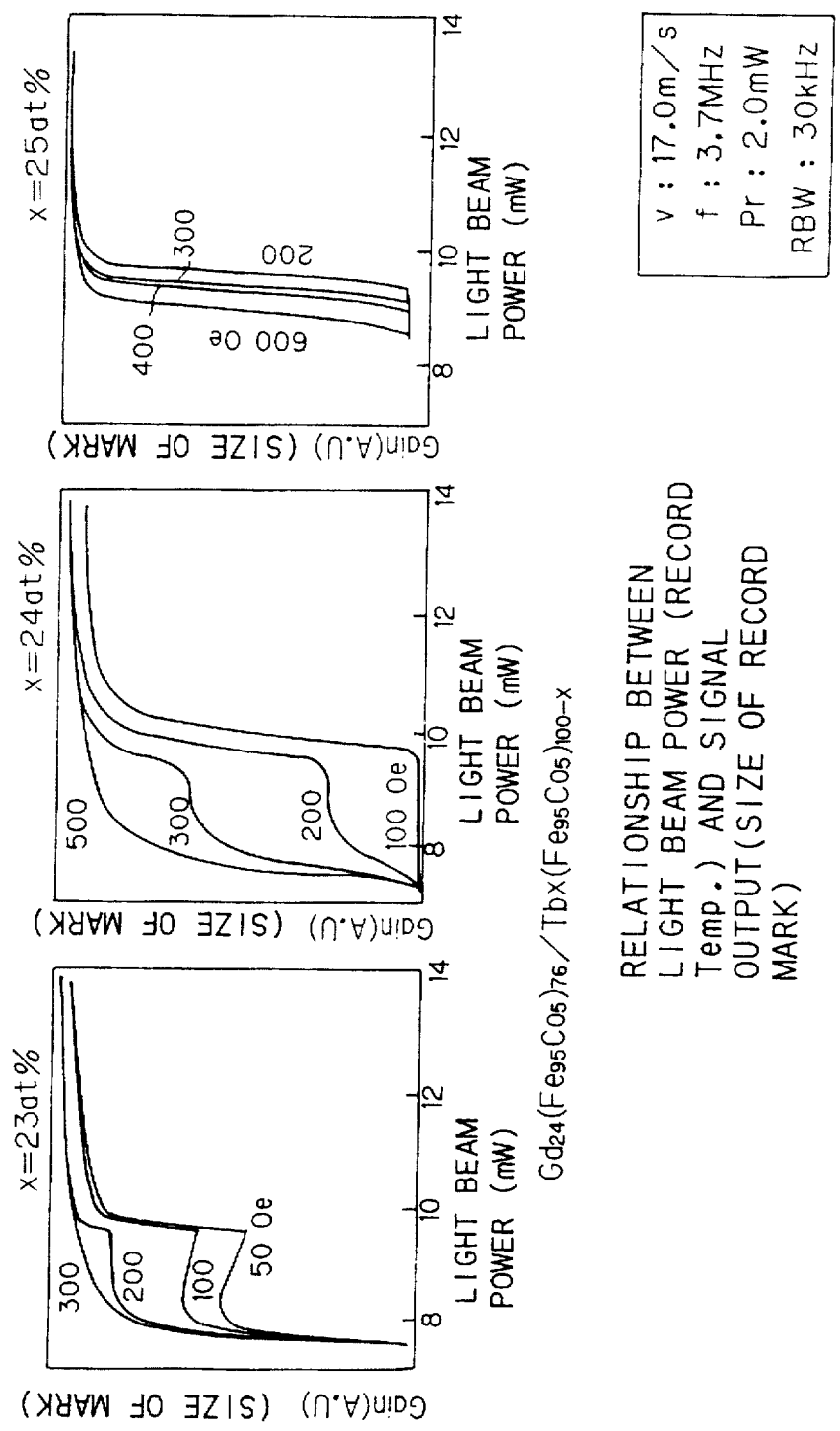

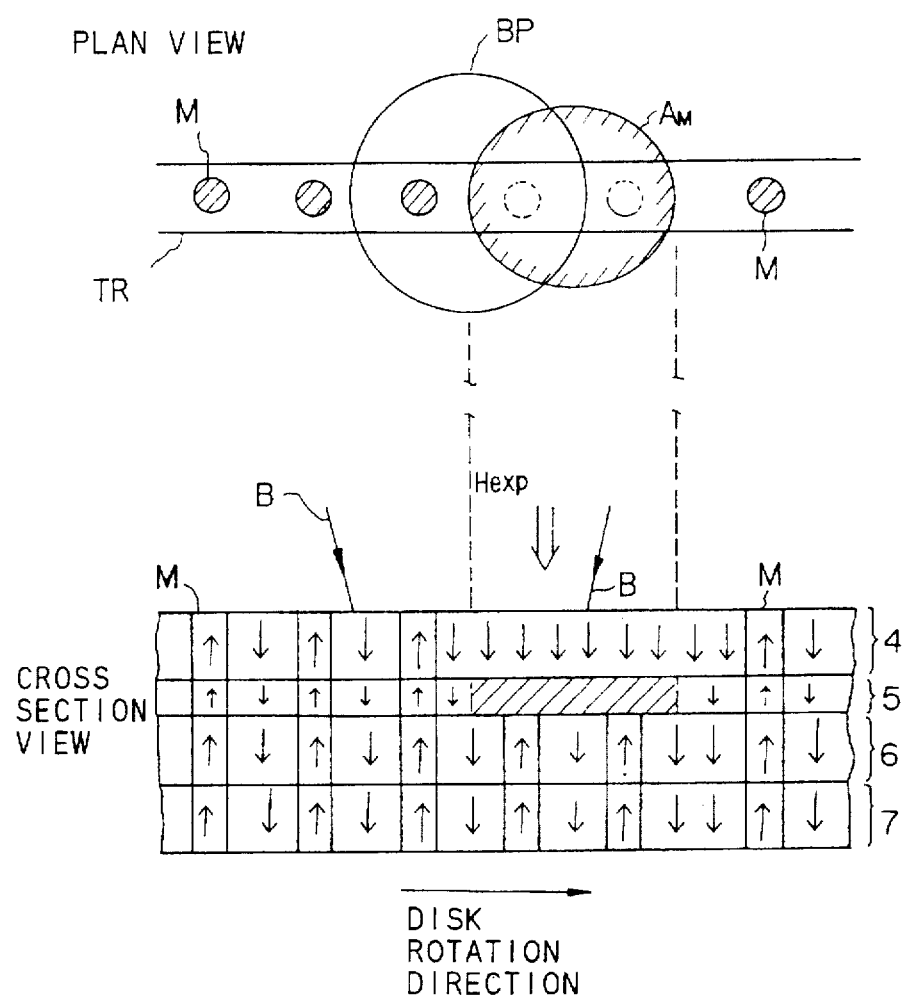

5,757,736

METHOD OF AND APPARATUS FOR RECORDING INFORMATION TO MAGNETO OPTICAL DISC HAVING PLURAL RECORDING LAYERS

BACKGROUND OF THE INVENTION

1. Field of the Invention

The present invention relates to an information recording method and apparatus, and more particularly to an information recording method and apparatus for recording information by using a magneto optical disc capable of carrying out a super resolution reproducing operation as a recording medium and by using a light intensity modulating way or a magnetic field modulation recording way as a recording method.

2. Description of the Related Art

In a field of a magneto optical disc, associated with a request to a high density record in recent years, a super resolution information recording and reproducing method has been developed for recording and reproducing information at a frequency higher than a spatial frequency determined by a wavelength of a laser light as a recording light or a reproducing light and a numerical aperture of an objective lens.

As information recording ways used for the super resolution information recording and reproducing method, there are a light intensity modulation recording way which modulates an intensity of a light beam such as a laser light or the like as a recording light corresponding to information to be recorded, irradiates it, and applies a recording external magnetic field having a constant magnitude to an irradiated position to thereby record the information, and a magnetic field modulation recording way which irradiates a light beam having a constant intensity and modulates a recording external magnetic field applied to an irradiated position corresponding to information to be recorded to thereby record the information.

By appropriately setting the intensity of the light beam irradiated to the record position, it is possible to form the record mark at a frequency higher than the spatial frequency determined by the wavelength of the light beam and the numerical aperture of the objective lens to thereby record the information. Namely, the super resolution recording operation can be performed based on either one of the light intensity modulation way and the magnetic field modulation recording way.

However, in the super resolution recording way for the information by using the magneto optical disc, the magnetic coercive force of the recording layer has such a relationship with the temperature that the magnetic coercive force is simply reduced in accordance with the increase of the temperature thereof. Thus, when the temperature within the light spot is varied in conjunction with variation of the intensity of the light beam, a size of the area of the recording layer whose magnetic coercive force is weakened (or the magnetization is lost) is also varied. This results in a problem that it is impossible to form the record mark with a stable size.

Then, the case of the light intensity modulation is considered here. If the temperature within the light spot is varied in conjunction with the variation of the intensity of the light beam, for example, the size of the area at the temperature equal to or more than a predetermined record temperature within the light spot is also varied. Accordingly, the size of the area (corresponding to the record mark) in which the magnetization direction is aligned by the bias magnetic field is also varied. Thus, it is impossible to form the record mark with the stable size. It is necessary to strictly control the intensity of the light beam in order to solve this problem. This results in a reduction of a power margin (an allowable range of the intensity variation) for that purpose, and also results in a reduction of a margin of a focus servo (an allowable range of a focusing variation) to focus the light beam into the record position. As a result, this brings about a problem of complex configurations and designs of a light beam intensity controlling apparatus and a focus servo apparatus.

This problem similarly exists in the case of recording the information under the condition that the highest temperature within the light spot is equal to or more than the Curie point of the recording layer. If the intensity of the light beam is varied, the size of the range at the temperature equal to or more than the Curie point is also varied. Thus, it is impossible to form the record mark with the stable size. As a result, it is necessary to strictly control the intensity of the light beam in order to solve this problem.

SUMMARY OF THE INVENTION

It is therefore an object of the present invention to provide an information recording method and apparatus, which can form a record mark with a stable and small size even if an intensity of a light beam is varied.

The above object of the present invention can be achieved by an information recording method of recording record information to a magneto optical disc. The magneto optical disc is provided with at least first and second recording layers such that the record information is recorded to the first recording layer at a vertically magnetized state thereof and is also recorded to the second recording layer at a vertically magnetized state thereof. The first recording layer has a first magnetic coercive force, whose changing rate in a predetermined temperature range is within a predetermined rate range, and also has a first Curie point. The second recording layer has a second magnetic coercive force, whose changing rate is larger than that of the first magnetic coercive force in the predetermined temperature range and which is stronger than the first magnetic coercive force at a room temperature, and also has a second Curie point, which is lower than the first Curie point. The information recording method is provided with the steps of: controlling an output power of a recording light such that a temperature of a record position, to which the record information is to be recorded, on the magneto optical disc becomes a predetermined record temperature higher than the second Curie point and lower than the first Curie point; irradiating the recording light, whose output power is controlled by the controlling step, to the record position; and applying, while irradiating the recording light to the magneto optical disc, to the record position, an external magnetic field, which is stronger than the first magnetic coercive force corresponding to the predetermined record temperature and is weaker than the first magnetic coercive force corresponding to a temperature inside and at the vicinity of a boundary line of an area of the first recording layer corresponding to an area of the second recording layer in which the second magnetic coercive force is zero because of an irradiation of the recording light, so as to form a record mark corresponding to the record information by aligning a direction of magnetization remaining in the first recording layer into a direction of the external magnetic field.

According to the method of the present invention, the output power of a recording light is controlled by the controlling step such that a temperature of a record position, to which the record information is to be recorded, on the magneto optical disc becomes a predetermined record temperature higher than the second Curie point and lower than the first Curie point. This recording light, whose output power is controlled in this manner by the controlling step, is irradiated to the record position. Along with this, while the recording light is irradiated to the magneto optical disc, the external magnetic field is applied to the record position. At this time, the external magnetic field is stronger than the first magnetic coercive force corresponding to the predetermined record temperature and is weaker than the first magnetic coercive force corresponding to a temperature inside and at the vicinity of a boundary line of an area of the first recording layer corresponding to an area of the second recording layer in which the second magnetic coercive force is zero because of an irradiation of the recording light. Thus, the direction of magnetization remaining in the first recording layer is aligned into a direction of the external magnetic field, so that the record mark corresponding to the record information is formed.

Accordingly, the record mark is formed under such a condition that the magnetization direction of the first recording layer, which corresponds to a smaller range than the area of the first recording layer corresponding to the area of the second recording layer in which the second magnetic coercive force is lost or zero, is in line with the direction of the recording external magnetic field. Therefore, the record information is recorded, and the appropriate record mark is transcribed into the second recording layer from the first recording layer and kept there. Thus, as compared with a case in which the temperature of the record position is made higher than the first Curie point and the second Curie point so that magnetizations of the first recording layer and the second recording layer are lost and the information is recorded by applying the external magnetic field in the temperature dropping process, it is possible to make a size of the record mark smaller according to the present invention.

Furthermore, since the changing rate of the first magnetic coercive force in the predetermined temperature range is within the predetermined rate range, even if the output power of the recording light is varied or fluctuated, the variation in the size of the area where the magnetization direction in the first recording layer becomes the direction of the external magnetization (i.e. the size of the record mark) is little or negligible. As a result, it is possible to form the record mark with a stable size even if the output power of the recording light is varied.

As one aspect of the method of the present invention, the method is further provided with the step of modulating the output power in accordance with the record information to be recorded.

According to this aspect, the output power is modulated by in accordance with the record information to be recorded. Thus, the light intensity modulation recording way is realized.

In this aspect, in the controlling step, the output power of the recording light may be controlled such that a temperature of a non-record position, to which the record mark is not to be formed, becomes a predetermined non-record temperature lower than the second Curie point and that the second magnetic coercive force corresponding to the predetermined non-record temperature is stronger than the external magnetic field. Thus, a stable record mark can be certainly formed by the light intensity modulation recording way.

As another aspect of the method of the present invention, the method is further provided with the step of modulating the external magnetic field in accordance with the record information to be recorded.

According to this aspect, the external magnetic field is modulated by in accordance with the record information to be recorded. Thus, the magnetic field modulation recording way is realized.

In this aspect, the external magnetic field may be modulated such that the direction of the external magnetic field is changed to either one of a first direction perpendicular to a plane of the magneto optical disc and a second direction opposite to the first direction in accordance with the record information to be recorded. Thus, a stable record mark can be certainly formed by the magnetic field modulation recording way.

As another aspect of the method of the present invention, the method is further provided with the step of erasing the record mark by applying a bias magnetic field whose magnetic direction is opposite to that of the external magnetic field before irradiating the recording light.

According to this aspect, before forming a new record mark, the previously recorded record mark can be certainly erased, so that the over-write operation can be reliably and efficiently performed.

The above object of the present invention can be also achieved by an information recording apparatus for recording record information to the above described magneto optical disc of the present invention. The information recording apparatus is provided with: an output power controller for controlling an output power of a recording light such that a temperature of a record position, to which the record information is to be recorded, on the magneto optical disc becomes a predetermined record temperature higher than the second Curie point and lower than the first Curie point; a light irradiation device for irradiating the recording light, whose output power is controlled by the output power controller, to the record position; and a magnetic field applying device for applying, while the light irradiation device irradiating the recording light to the magneto optical disc, to the record position, an external magnetic field, which is stronger than the first magnetic coercive force corresponding to the predetermined record temperature and is weaker than the first magnetic coercive force corresponding to a temperature inside and at the vicinity of a boundary line of an area of the first recording layer corresponding to an area of the second recording layer in which the second magnetic coercive force is zero because of an irradiation of the recording light, so as to form a record mark corresponding to the record information by aligning a direction of magnetization remaining in the first recording layer into a direction of the external magnetic field.

According to the information recording apparatus of the present invention, the aforementioned information recording method of the present invention can be certainly performed. Therefore, it is possible to make a size of the record mark smaller, and it is also possible to form the record mark with a stable size even if the output power of the recording light is varied according to the information recording apparatus of the present invention.

As one aspect of the apparatus of the present invention, the output power controller modulates the output power in accordance with the record information to be recorded.

According to this aspect, the output power is modulated by in accordance with the record information to be recorded. Thus, the light intensity modulation recording way is realized.

In this aspect, the output power controller may control the output power such that a temperature of a non-record position, to which the record mark is not to be formed, becomes a predetermined non-record temperature lower than the second Curie point and that the second magnetic coercive force corresponding to the predetermined non-record temperature is stronger than the external magnetic field. Thus, a stable record mark can be certainly formed by the light intensity modulation recording way.

As another aspect of the apparatus of the present invention, the magnetic field applying device modulates the external magnetic field in accordance with the record information to be recorded.

According to this aspect, the external magnetic field is modulated by in accordance with the record information to be recorded. Thus, the magnetic field modulation recording way is realized.

In this aspect, the magnetic field applying device may modulate the external magnetic field such that the direction of the external magnetic field is changed to either one of a first direction perpendicular to a plane of the magneto optical disc and a second direction opposite to the first direction in accordance with the record information to be recorded. Thus, a stable record mark can be certainly formed by the magnetic field modulation recording way.

As another aspect of the apparatus of the present invention, the output power controller has an APC (Automatic Gain Control) circuit.

According to this aspect, the output power can be reliably and rather easily controlled by use of the APC circuit.

The nature, utility, and further features of the present invention will be more clearly apparent from the following detailed description with respect to a preferred embodiment of the invention when read in conjunction with the accompanying drawings briefly described below.

BRIEF DESCRIPTION OF THE DRAWINGS

FIG. 3 is a schematically block diagram of a magneto optical disc information recording and reproducing apparatus of the embodiment;

FIG. 7A is a graph for showing a relationship between a light beam power (a record temperature) and a signal power (a size of a record mark) in the magneto optical disc in a case that an element ratio of a terbium in a second layer is 23 [at %];

FIG. 7B is a graph for showing a relationship between a light beam power (a record temperature) and a signal power (a size of a record mark) in the magneto optical disc in a case that the element ratio of the terbium in the second layer is 24 [at %];

FIG. 7C is a graph for showing a relationship between a light beam power (a record temperature) and a signal power (a size of a record mark) in the magneto optical disc in a case that the element ratio of the terbium in the second layer is 25 [at %];

FIG. 8 is a diagram for explaining a reproducing operation;

DESCRIPTION OF THE PREFERRED EMBODIMENT

A preferred embodiment of the present invention will be hereinafter explained with reference to the drawings.

(I) Principle of Recording Magneto Optical Disc

At first, a principle of recording information to a magneto optical disc used in the embodiment is explained with reference to FIGS. 10 to 13.

(I-1) Light Intensity Modulation Recording Way

Figure 10:
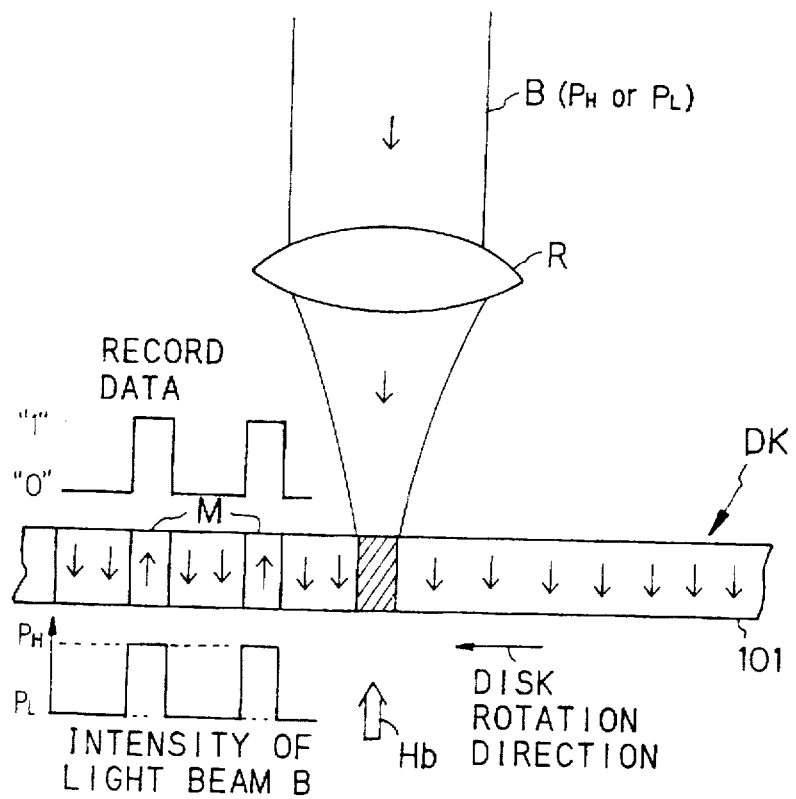
FIG. 10 is a diagram for explaining a principle of information recording operation by means of a light intensity modulation way.
Figure 12:
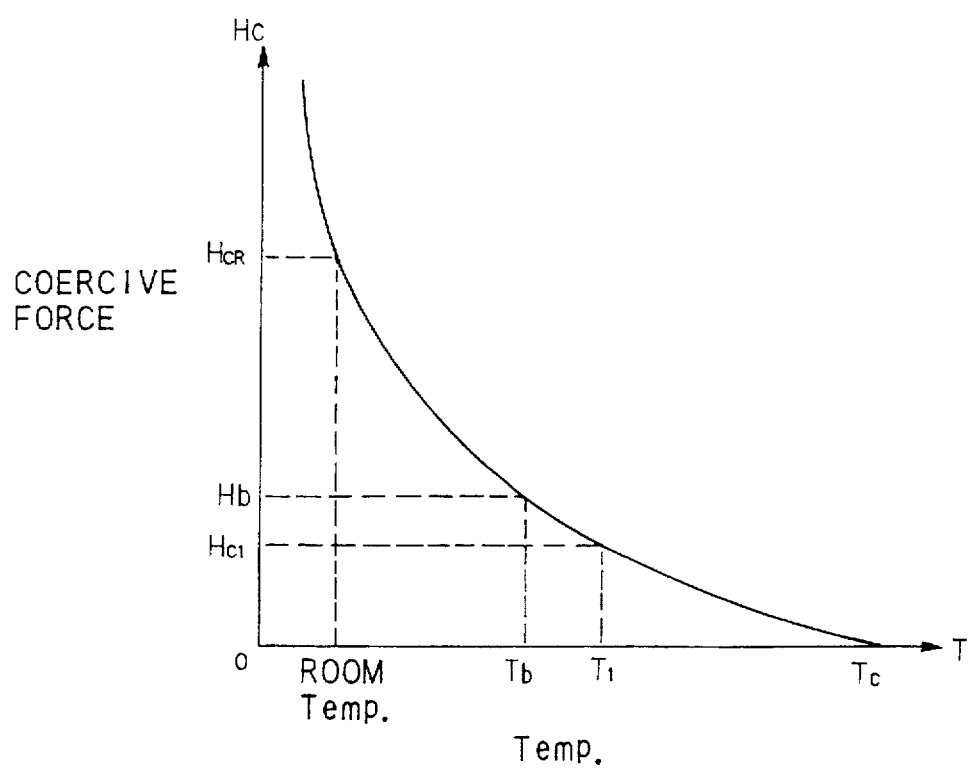
FIG. 12 is a graph for showing a relationship between a temperature and a magnetic coercive force in a1 recording layer.

The principle of the light intensity modulation recording way used in a super resolution recording method of the embodiment is explained here with reference to FIGS. 10 and 12.

In FIG. 10, only a recording layer 101 which contributes to recording of the information is illustrated in a magneto optical disc DK. However, the magneto optical disc DK actually has an intermediate layer (a switching layer) or a reproducing layer which is laminated on the recording layer 101 and intended to reproduce the recorded information as described later in detail. A configuration of the appropriate intermediate layer (switching layer) or reproducing layer is different on the basis of an information reproducing method. The recording layer 101 is made of alloy of rare earth metal and transition metal. A relationship between a temperature and a magnetic coercive force thereof is assumed to be as shown in FIG. 12.

As shown in FIG. 10, in the magneto optical disc DK used for recording the information by means of the light intensity modulation recording way, the information is erased by continuously irradiating a light beam B having a high power $P_H$ in advance as a DC light and also applying a downward bias magnetic field corresponding to "0" in the information to be recorded and aligning a magnetization direction of the recording layer 101 in a downward direction.

At the same time when the light beam B is irradiated which is intensity-modulated in correspondence with the record information such that it has the high power $P_H$ at a time of corresponding to "1" in the record information and it has a low power $P_L$ at a time of corresponding to "0" in the record information, a bias magnetic field $H_b$ is applied. Accordingly, a record mark M corresponding to the record information is formed and thereby the information is recorded.

The recording layer 101 is a recording layer to which the information is recorded by a vertical magnetization. The information is recorded such that a direction of the vertical magnetization corresponds to "1" or "0" in the information to be recorded. In FIG. 10, an upward vertical magnetization corresponds to "1", and a downward vertical magnetization corresponds to "0".

Next, a light intensity modulation recording operation to the magneto optical disc DK having a configuration shown in FIG. 10 is explained.

As mentioned above, the light beam B is irradiated to the magneto optical disk DK in which the information is erased in advance, and the bias magnetic field $H_b$ is simultaneously applied thereto. Accordingly, new information is recorded (in other words, the magnetization corresponding to "1" in the new record information is formed). At this time, the light beam B is beam-condensed and irradiated such that a light spot is formed at a record position to which the information on the magneto optical disc DK is to be recorded by an objective lens R.

Namely, in a case of forming the record mark M and recording the new information, the power of the light beam B is set to the high power $P_H$. Then, the light spot is formed on a surface of the recording layer 101, and thereby a temperature of the recording layer 101 within the light spot is increased.

Here, the magnetic coercive force of the recording layer 101 has such a relationship with the temperature that the magnetic coercive force is simply reduced in accordance with an increase of a temperature thereof as shown in FIG. 12. If the temperature is increased by the irradiation of the light beam B, for example, if the temperature is increased from a room temperature to $T_1$ in FIG. 12, the magnetic coercive force is reduced from $H_{CR}$ to $H_{C1}$. Then, for example, when the temperature of the recording layer 101 within the light spot is increased up to the $T_1$ with the power of the light beam B as the high power $P_H$, and if the bias magnetic field $H_b$ stronger than the $H_{C1}$ is applied at the same time, a magnetization direction at a portion whose temperature is equal to or more than the $T_1$ in the recording layer 101 is changed into a direction of the bias magnetic field $H_b$. Here, the direction of the bias magnetic field $H_b$ is an upward direction, that is, the magnetization direction at a time of forming the record mark M and recording the information corresponding to "1" in the record information. Accordingly, the record mark M is formed at the portion whose temperature is equal to or more than the $T_1$ in the recording layer 101 and thereby the information is recorded.

On the other hand, in a case that the record mark M is not to be formed, that is, in a case of forming an area corresponding to "0" in the record information, the light beam B is set to the low power $P_L$. This low power $P_L$ is set to such a value that the temperature of the recording layer 101 is a temperature at which the magnetic coercive force of the recording layer 101 can be kept stronger than the bias magnetic field $H_b$. More actually, the low power $P_L$ is a weak power such that the temperature of the recording layer 101 is not higher than a temperature $T_b$ corresponding to the bias magnetic field $H_b$ in FIG. 12. In a case where the light beam B having this low power $P_L$ is irradiated, since the magnetic coercive force of the recording layer 101 is stronger than the bias magnetic field $H_b$, the magnetization of the recording layer 101 is not inverted, and an initialized state is kept. That is, the area corresponding to "0" is formed.

As mentioned above, the information is recorded by applying the bias magnetic field $H_b$ having the constant magnitude while modulating the intensity of the light beam B corresponding to the record information.

Further, in a case of forming the record mark M as the other information recording way using the light intensity modulation way, there is a method of setting the high power $P_H$ such that the temperature of the recording layer 101 is equal to or more than a Curie point $T_C$ thereof. In this case, the magnetization of the recording layer 101 is lost.

However, if the temperature drops out of a range of the light spot under this state, the recording layer 101 is magnetized in the direction of the bias magnetic field $H_b$, and the record mark M is formed. Accordingly, the information is recorded.

(I-2) Magnetic Field Modulation Recording Way

Figure 11:
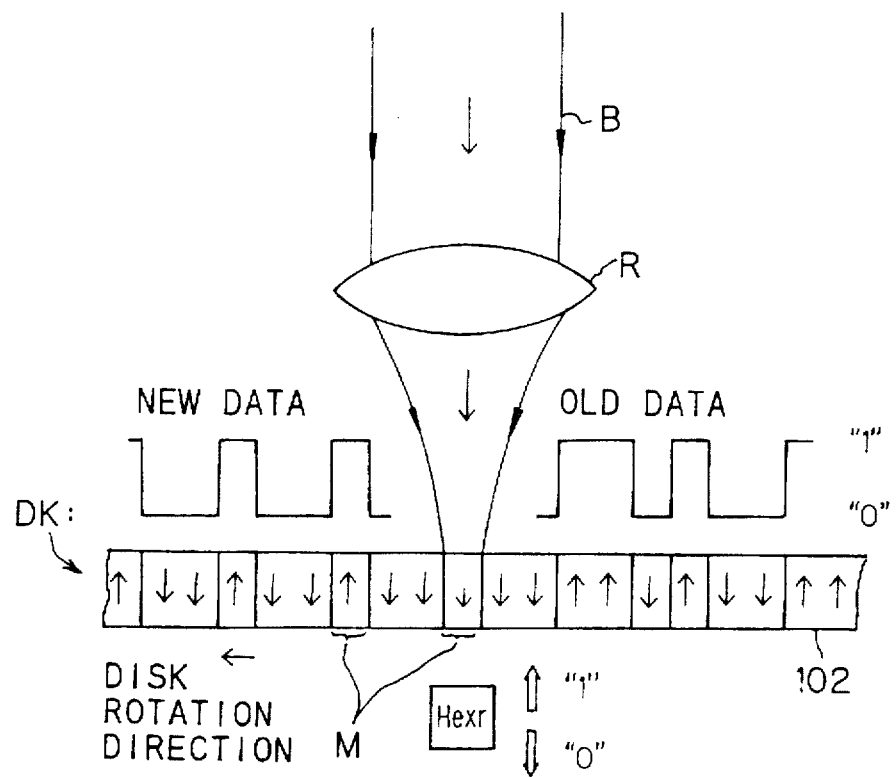
FIG. 11 is a diagram for explaining a principle of an over-write operation by means of a magnetic field modulation way.

The principle of the magnetic field modulation recording way used in a super resolution recording method of the embodiment is explained here with reference to FIGS. 11 and 12.

FIG. 11 shows an over-write operation (over-writing of information) by using the magnetic field modulation recording way.

In FIG. 11, only a recording layer 102 which contributes to the recording of the information is illustrated in a magneto optical disc DK. However, the magneto optical disc DK actually has an intermediate layer (a switching layer) or a reproducing layer which is laminated on the recording layer 102 and intended to reproduce the recorded information. A configuration of the appropriate intermediate layer (switching layer) or reproducing layer is different on the basis of the information reproducing method.

The recording layer 102 in the magneto optical disc DK used for the magnetic field modulation recording way is a recording layer to which the information is recorded by the vertical magnetization. The information is recorded such that a direction of the vertical magnetization corresponds to "1" or "0" in the information to be recorded. In FIG. 11, an upward vertical magnetization corresponds to "1", and a downward vertical magnetization corresponds to "0". As a substance for this recording layer, TbFeCo or the like is used similarly to the case of the light intensity modulation way.

When the recorded information is to be over-written as shown in FIG. 11, a light beam B having a constant intensity is irradiated to the recording layer 102 of the magneto optical disc DK to which the information is recorded. At this time, similarly to the case of the light intensity modulation way, the light beam B is beam-condensed and irradiated such that the light spot is formed at the record position to which the information on the magneto optical disc DK is to be recorded by the objective lens R. In this case, a temperature of the recording layer 102 within the light spot is increased, if setting the light beam B to a predetermined intensity.

Here, the magnetic coercive force of the recording layer 102 has such a relationship with the temperature that the magnetic coercive force is simply reduced in accordance with the increase of the temperature thereof as shown in FIG. 12. If the temperature is increased by the irradiation of the light beam B, for example, if the temperature is increased from the room temperature to the $T_1$ in FIG. 12, the magnetic coercive force is reduced from the $H_{CR}$ to the $H_{C1}$. Then, for example, when the temperature of the recording layer 102 within the light spot is increased up to the $T_1$, and if a recording external magnetic field $H_{exr}$ stronger than the $H_{C1}$ is applied at the same time, a magnetization direction at a portion whose temperature is equal to or more than the $T_1$ in the recording layer 102 is changed into a direction of the recording external magnetic field $H_{exr}$. Thus, if the direction of the recording external magnetic field $H_{exr}$ is changed corresponding to the information to be recorded (for example, in FIG. 11, the upward direction corresponds to "1", and the downward direction corresponds to "0"), as shown in FIG. 11, the information to be recorded is recorded to the recording layer 102 as the record mark M by the direction of the vertical magnetization.

Further, as the other information recording way using the magnetic field modulation way, there is a method of forming an area whose temperature is equal to or more than the Curie point $T_C$ of the recording layer 102 within the light spot and applying the recording external magnetic field $H_{exr}$ to the area to thereby record the information.

Next, this method is explained more actually. At a time of recording or over-writing the information, the intensity of the light beam B is adjusted appropriately so that a maximum temperature of the recording layer 102 within the light spot is equal to or more than the Curie point $T_C$ of the recording layer 102. Accordingly, a range in which the magnetic coercive force becomes zero and a magnetized domain is lost is formed within the light spot. The range in which this magnetized domain is lost is out of a range of the light spot associated with a movement resulting from a rotation of the magneto optical disc DK, and thereby the temperature drops. If the recording external magnetic field $H_{exr}$ modulated by the information to be recorded is applied at this temperature dropping process, a magnetization direction that is newly induced at the temperature dropping process becomes a direction of the applied recording external magnetic field $H_{exr}$ and thereby the information to be recorded is recorded by the appropriate magnetization direction.

(I-3) Super Resolution Recording Way

Next, the principle of super resolution recording way in the embodiment based on the above explained light intensity modulation way or the magnetic field modulation recording way, is explained with reference to FIG. 13. In this case, by appropriately setting the intensity of the light beam B irradiated to the record position, it is possible to form the record mark M at a frequency higher than the spatial frequency determined by the wavelength of the light beam B and the numerical aperture of the objective lens R to thereby record the information.

Figure 13A:
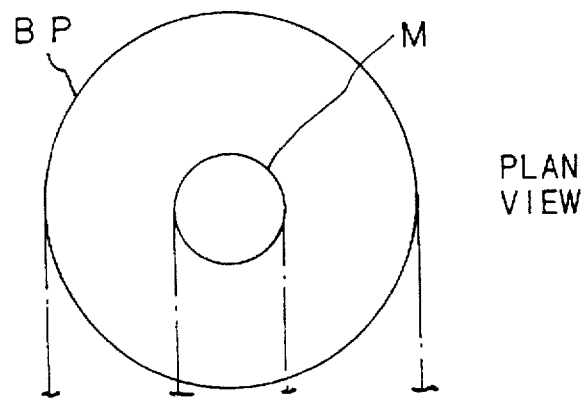
FIG. 13 is a view for explaining a forming of a record mark smaller than a light spot.
Figure 13B:
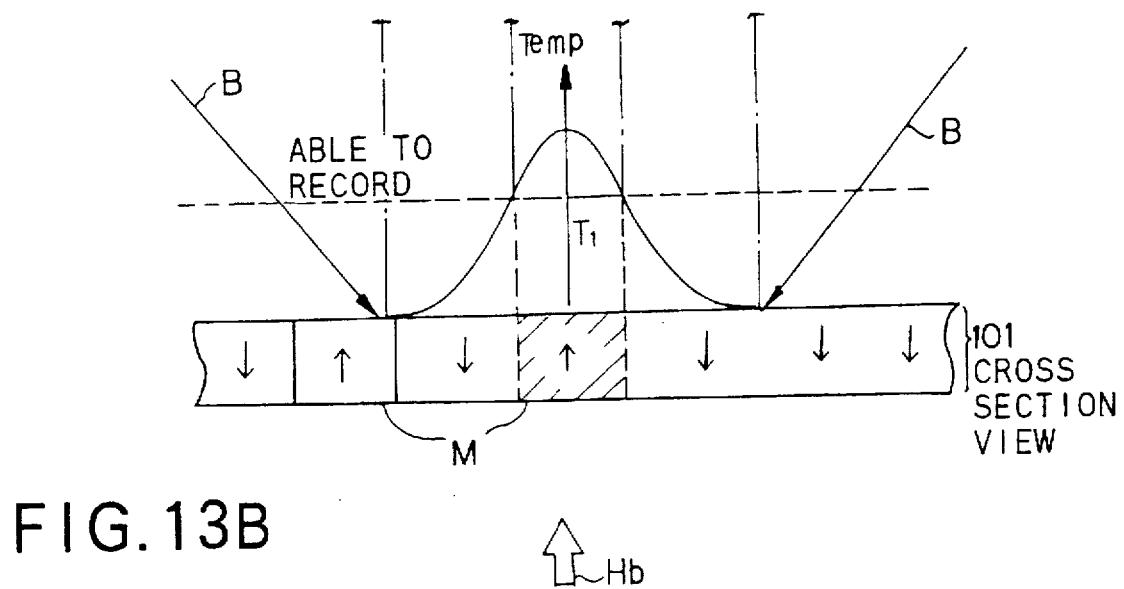

FIG. 13 shows the super resolution recording operation using the light intensity modulation way, for example.

In general, in a light spot BP, a temperature distribution therein is a mountain-shaped distribution in which a central portion of the light spot BP is the highest portion, as shown in FIG. 13. If setting the intensity of the light beam B such that the highest temperature within the light spot BP is higher than the temperature $T_1$, an area at a temperature equal to or more than the temperature $T_1$ within the light spot BP is smaller than the light spot BP. Then, if applying the above mentioned bias magnetic field $H_b$ simultaneously at this time, only a magnetization direction within the area at the temperature equal to or more than the temperature $T_1$ within the light spot BP is aligned in a direction of the bias magnetic field $H_b$. Accordingly, it is possible to form on the recording layer 101 the record mark M, which is smaller than the light spot BP, that is, which has the frequency higher than the spatial frequency (a spatial frequency in an optical system of a recording apparatus) determined by the wavelength of the light beam B and the numerical aperture of the objective lens R.

On the other hand, even in a case of recording the information under a condition that the highest temperature within the light spot BP is equal to or more than the Curie point $T_C$ of the recording layer 101 (refer to FIG. 12), if adjusting the intensity of the light beam B such that a range at a temperature equal to or more than the Curie point $T_C$ is smaller than that of the light spot BP (namely, such that the lowest temperature within the range of the light spot BP is lower than the Curie point $T_C$), a range in which a magnetization is induced corresponding to the bias magnetic field $H_b$ at the temperature dropping process is smaller than the range of the light spot BP. As a result, it is possible to form the record mark M smaller than the range of the light spot BP.

This super resolution recording way can implement a super resolution recording operation in a rotationally tangential direction of the magneto optical disk, if making a switching speed of an applied magnetic field fast, even in a case of the magnetic field modulation way. Further, it is possible to similarly implement a super resolution recording operation in a radius direction of the magneto optical disc, by making the highest temperature within the light spot BP equal to or more than the temperature $T_1$ shown in FIG. 12 or the Curie point $T_C$ of the recording layer 102 and making the lowest temperature therein equal to or less than the temperature $T_1$ or the Curie point $T_C$.

According to the above mentioned super resolution recording way, it is possible to form the record mark M at a spatial frequency higher than the spatial frequency in the optical system of the recording apparatus for the magneto optical disc DK.

However, in this basic super resolution recording way for the information by using the magneto optical disc DK, the magnetic coercive force of the recording layer 101 or 102 has such a relationship with the temperature that the magnetic coercive force of the recording layer 101 or 102 is simply reduced in accordance with the increase of the temperature thereof as shown in FIG. 12. Thus, when the temperature within the light spot BP is varied in conjunction with variation of the intensity of the light beam B, a size of the area of the recording layer 101 or 102 whose magnetic coercive force is weakened (or the magnetization is lost) is also varied. This results in a problem that it is difficult to form the record mark with a stable size.

Then, the case of the light intensity modulation is considered. If the temperature within the light spot BP is varied in conjunction with the variation of the intensity of the light beam B, for example, the size of the area at the temperature equal to or more than the temperature $T_1$ within the light spot BP is also varied. Accordingly, the size of the area (corresponding to the record mark M (refer to a symbol M of FIG. 13)) in which the magnetization direction is aligned by the bias magnetic field $H_b$ is also varied. Thus, it is difficult to form the record mark M with the stable size.

This problem similarly exists in the case of recording the information under the condition that the highest temperature within the light spot BP is equal to or more than the Curie point $T_C$ of the recording layer 101. If the intensity of the light beam B is varied, the size of the range at the temperature equal to or more than the Curie point $T_C$ is also varied. Thus, it is difficult to form the record mark M with the stable size.

The present embodiment as described hereinafter in detail is proposed from the viewpoint of the above mentioned problems.

(II) Construction of Magneto Optical Disc

A construction of a magneto optical disc according to this embodiment is explained with reference to FIG. 1.

Figure 1:
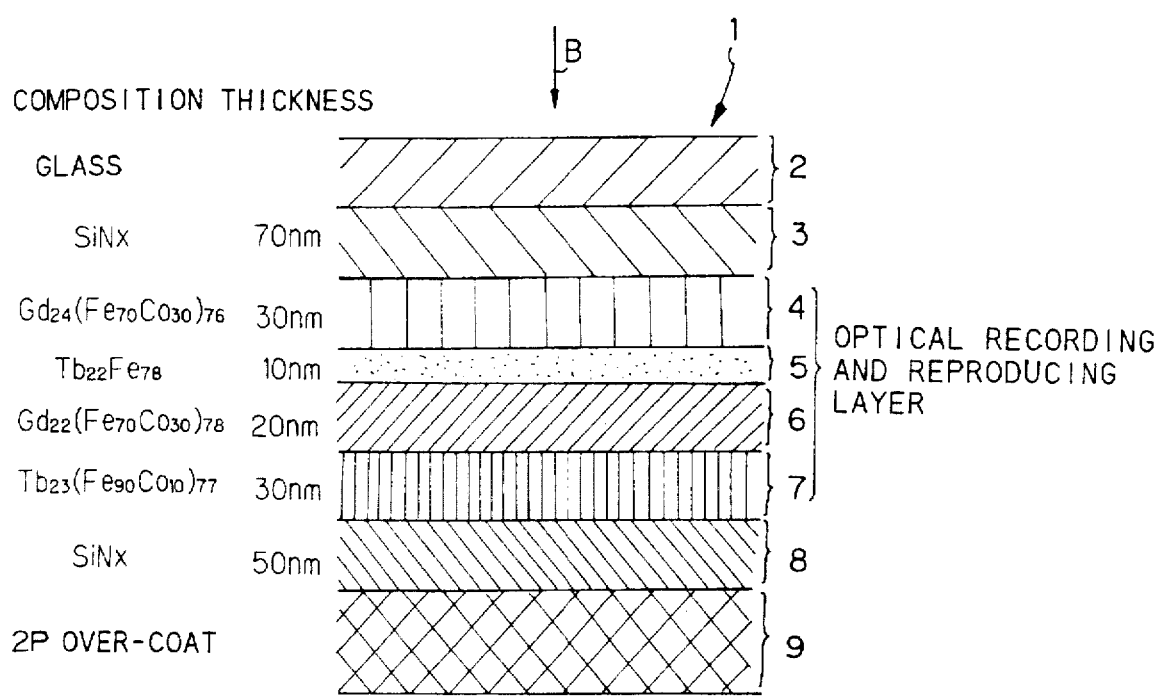
FIG. 1 is a sectional view for showing a configuration of a magneto optical disc of an embodiment.

A magneto optical disc 1 according to the embodiment shown in FIG. 1 is provided, in a form of lamination and in an order from an irradiation side of a light beam B as a recording light, with: a substrate 2 that is a main body of the magneto optical disc 1; a dielectric protecting layer 3 for protecting an optical recording and reproducing layer described later; a reproducing layer 4, which maintains, by means of a switched connection to a first recording layer 6 described later through an intermediate layer 5 described later at a room temperature, the same magnetization direction (a record mark M) as those of the first recording layer 6 and a second layer 7 described later, and in which at a time of reproducing, a portion where the switched connection to the first recording layer 6 through the intermediate layer 5 is cut off because of heat resulting from the irradiation of the light beam B is magnetized in a direction of a reproducing external magnetic field $H_{exp}$, and which becomes a mask layer where the magnetization of the first recording layer 6 is not transcribed; the first recording layer 6 and the second recording layer 7 in which the record mark M is formed by a magnetization direction at a vertically magnetized state due to an operation described later and to which information is recorded; a dielectric protecting layer 8 for protecting the optical recording and reproducing layer described later; and a resin protecting film 9 constituted by a 2P over-coat and the like to coat and protect the magneto optical disc 1. What actually contribute to a recording operation of the embodiment are the first recording layer 6 and the second recording layer 7 in the above mentioned configuration. Further, what contribute to a reproducing operation of recorded information are the reproducing layer 4, the intermediate layer 5, the first recording layer 6 and the second layer 7. Then, the layers 4 to 7 which contribute to the recording operation and the reproducing operation are integrally referred to as the optical recording and reproducing layer.

Next, actions, compositions and film thicknesses of the respective layers are explained.

The boards 2 supports the whole magneto optical layer 1. A substance which transmits the light beam Band is difficult to refract is used for a material of the substrate 2. Actually, glass or the like is used. The film thickness is allowable which has a sufficient strength to support the magneto optical disc 1 and has no influence on the transmission of the light beam B. Actually, it approximately ranges from 0.6 mm to 1.2 mm.

The dielectric protecting layers 3 and 8 transmit the light beam B and also protect the optical recording and reproducing layer. For the performance of this film, it is necessary that the film is transparent so as to have no influence on the transmission of the light beam B and has elaborate composition to which water and the like can not be transmitted so as to have no influence on the operation of the optical recording and reproducing layer. SiNx, AlN, $Ta_2O_5$ and the like can be used as the composition having the above mentioned performance. The film thickness equal to or more than a thickness that can resist aged deterioration or oxidation (for example, approximate 20 nm) is required. Further, the film thickness equal to or less than a thickness that has no influence on heat conduction or light transmission performance (for example, approximate 100 nm) is desirable.

The intermediate layer 5 needs to have a high magnetic coercive force at the room temperature since it is necessary to transcribe to the reproducing layer 4 the record mark M formed in the first recording layer 6 by a switched connection between the first recording layer 6 and the reproducing layer 4 at the room temperature. Further, at a time of reproducing, it is necessary to cut off the switched connection force between the first recording layer 6 and the reproducing layer 4 by the heat resulting from the irradiation of the light beam B. Thus, a magnetized domain in the intermediate layer 5 is required to be lost at the heated time. Therefore, a Curie point of the appropriate intermediate layer 5 (hereafter, referred to as $T_{CS}$) is required to be lower than a temperature reached at the heated time. Simultaneously, it is necessary that the magnetizations of the other magnetic layers constituting the optical recording and reproducing layer are not lost at the time of reproducing. As a result, the Curie point $T_{CS}$ of the intermediate layer 5 is required to be lower than any of the respective Curie points of the other magnetic layers (the reproducing layer 4, the first recording layer 6 and the second recording layer 7) constituting the optical recording and reproducing layer.

The composition of the intermediate layer satisfying these conditions is, for example, $Tb_{22}Fe_{78}$ [at %]. It is desirable that a film thickness thereof is approximate 10 mm.

Here, the numeral in the composition equation represents an atomic amount ratio of two types of alloys. For example, in a representation of $A_nB_m$ [at %], n+m=100. This equation means that this substance is composed of n % of A atoms and m % of B atoms among the total number of atoms.

The record mark M on the first recording layer 6 is transcribed into the reproducing layer 4 by the switched connection force through the intermediate layer 5 at the room temperature. Further, at the time of reproducing, the magnetized domain of the intermediate layer 5 is lost because of a temperature rise associated with the heat resulting from the irradiation of the light beam B. The portion in which the switched connection to the first recording layer 6 is cut off is magnetized in the direction of the reproducing external magnetic field $H_{exp}$. The appropriate portion functions as a mask area to which the magnetization of the first recording layer 6 is not transcribed and in which information can not be read out. At this time, a reached temperature (hereafter, referred to as a reproducing temperature) of the mask area at the time of the temperature rise in the reproducing operation is set lower than a Curie point of the first recording layer 6 (hereafter, referred to as $T_{CR1}$) in order to maintain the record mark M in the first recording layer 6, and higher than the Curie point $T_{CS}$ of the intermediate layer 5. In the reproducing layer 4, the magnetization direction at the time of reproducing is aligned by the reproducing external magnetic field $H_{exp}$ (normally, approximate 300 oersted) in a direction of the appropriate reproducing external magnetic field $H_{exp}$, and accordingly the mask area is formed. Thus, it is necessary to provide the magnetic coercive force under which the magnetization is not lost at the reproducing temperature and which is smaller than the reproducing external magnetic field $H_{exp}$ applied at the appropriate reproducing temperature.

Further, a magnitude of the reproducing external magnetic field $H_{exp}$ is set weaker than those of the magnetic coercive forces of the first recording layer 6 and the second recording layer 7 at the reproducing temperature, in order to maintain the record mark M in the first recording layer 6. Thus, it is necessary that the magnetic coercive force at the reproducing temperature of the reproducing layer 4 is also weaker than those of the first recording layer 6 and the second recording layer 7.

From the above mentioned conditions, for the Curie point $T_{CP}$ of the reproducing layer 4 and the magnetic coercive force thereof (hereafter, referred to as $H_{CP}$), it is necessary to satisfy a condition, as following.

$$T_{CP} > T_{CS} \tag{1}$$

And, at the vicinity of the reproducing temperature, it is necessary to satisfy a condition, as following.

$$T_{CP} < H_{CR1}, \text{ and } H_{CP} < 1 \text{ Kilo-Oersted} \tag{2}$$

Here, the $H_{CR1}$ is the magnetic coercive force of the first recording layer 6.

The composition of the reproducing layer 4 for the above mentioned conditions is, under a composition equation of $Gd_{x1}(Fe_{100-y1}Co_{y1})_{100-x1}$ [at %], expressed as following.

$$20 < x1 < 25, \text{ and } 5 < y1 < 40$$

More desirably, as shown in FIG. 1, it is expressed as following.

$$x1=24, \text{ and } y1=30 \text{ (i.e. } Gd_{24}(Fe_{70}Co_{30})_{76})$$

Although the film thickness of the reproducing layer 4 is desirable to be approximate 30 nm, it is allowable to be ranging from 10 nm to 60 nm.

The first recording layer 6 is a recording layer in which at first the record mark M is formed by a recording external magnetic field $H_{ex}$, in a recording operation described later. As characteristic of this layer, it is necessary that this layer is made of magnetic material having vertical magnetization, that the Curie point $T_{CR1}$ is higher than a Curie point of the second recording layer 7, and that variation of the magnetic coercive force $H_{CR1}$ to a predetermined temperature range is within a predetermined range which is sufficiently small (more actually, for example, the magnetic coercive force $H_{CR1}$ at a temperature equal to or more than 130° C. ranges from 0 to 500 oersted). At the time of reproducing, it is necessary that the record information (magnetization direction) is not lost even when a certain portion (mask area) of an irradiation range of the light beam B of the magneto optical disc 1 reaches the reproducing temperature.

From the above mentioned conditions, it is necessary that the Curie point $T_{CR1}$ of the first recording layer 6 is higher than the Curie point $T_{CR2}$ of the second recording layer 7 and the magnetic coercive force $H_{CR1}$ satisfies the above mentioned condition (2).

The composition of the first recording layer 6 for the above mentioned conditions is, under a composition equation of $Gd_{x2}(Fe_{100-y2}Co_{y2})_{100-x2}$ [at %], expressed as following.

$$19 \leq x2 \leq 30, \text{ and } 5 \leq y2 \leq 30$$

More desirably, as shown in FIG. 1, it is expressed as following.

$$x2=22, \text{ and } y2=30 \text{ (i.e. } Gd_{22}(Fe_{70}Co_{30})_{78})$$

In a case of this composition, the Curie point $T_{CR1}$ of the first recording layer 6 is higher than a temperature between 200° C. and 400° C.

It is desirable that a film thickness $t_{R1}$ of the first recording layer 6 is approximate 20 nm. However, other than this film thickness, it is allowable that the film thickness $t_{R1}$ ranges from 5 nm to 100 nm if a film thickness combined with the second recording layer 7 is thicker than 10 nm and thinner than 150 nm. This film thickness is determined on the basis of film uniformity and increase of calorific capacity. That is, if too thin, the film is not formed uniformly. On the contrary, if too thick, it is difficult to form a minute record mark M because of the increase of the calorific capacity. Thus, the above mentioned range is defined from the viewpoint of these situations.

The second recording layer 7 is a recording layer which the record mark M formed in the first recording layer 6 at the recording operation described later is transcribed to and kept in at a temperature dropping process associated with the rotation of the magneto optical disc 1. As characteristic of this layer, similarly to the first recording layer 6, it is necessary that this layer is made of the magnetic material having the vertical magnetization, that the Curie point $T_{CR2}$ is lower than the Curie point $T_{CR1}$ of the first recording layer 6, and that a magnetic coercive force $H_{CR2}$ at the room temperature is sufficiently strong to such an extent that the record mark M can be maintained. That is, it is necessary that the magnetic coercive force is sharply changed and the Curie point is low as compared with the first recording layer 6. At the time of reproducing, it is necessary that the record information (magnetization direction) is not lost even when a certain portion (mask area) of the irradiation range of the light beam B of the magneto optical disc 1 reaches the reproducing temperature.

Further, based on a principle of maintaining the record mark M in the embodiment in which the record mark M formed in the first recording layer 6 is transcribed at the temperature dropping process, the composition of configuration elements in the second recording layer 7 is such that a compensation point temperature $T_{COMP}$ of the second recording layer 7 (a temperature at which the magnetization becomes transiently zero at a temperature less than a Curie point because of magnetization balance between the configuration elements constituting the second recording layer 7) ranges from the room temperature to 100° C.

An actual example of the composition of the second recording layer 7 for the above mentioned conditions is, under a composition equation of $Tb_{x3}(Fe_{100-y3}Co_{y3})_{100-x3}$ [at %], expressed as following.

$$x3=23, \text{ and } y3=10 \text{ (i.e. } Tb_{23}(Fe_{90}Co_{10})_{77})$$

In a case of this composition, although the Curie point $T_{CR2}$ of the second recording layer 7 is 170° C., it is adequate that the Curie point $T_{CR2}$ of the second recording layer 7 ranges from 120° C. to 170° C.

It is desirable that a film thickness $T_{R2}$ of the second recording layer 7 is approximate 30 nm. However, from the reason similar to the condition of the film thickness in the first record layer 6, it is allowable that the film thickness $T_{R2}$ ranges from 5 nm to 100 nm if a film thickness combined with the first recording layer 6 is thicker than 10 nm and thinner than 150 nm.

Now, changes of the temperature and the magnetic coercive force in a case of assuming the first recording layer 6 and the second recording layer 7 in the magneto optical disc 1 of the embodiment to be one recording layer, will be explained with reference to FIG. 2.

Figure 2:
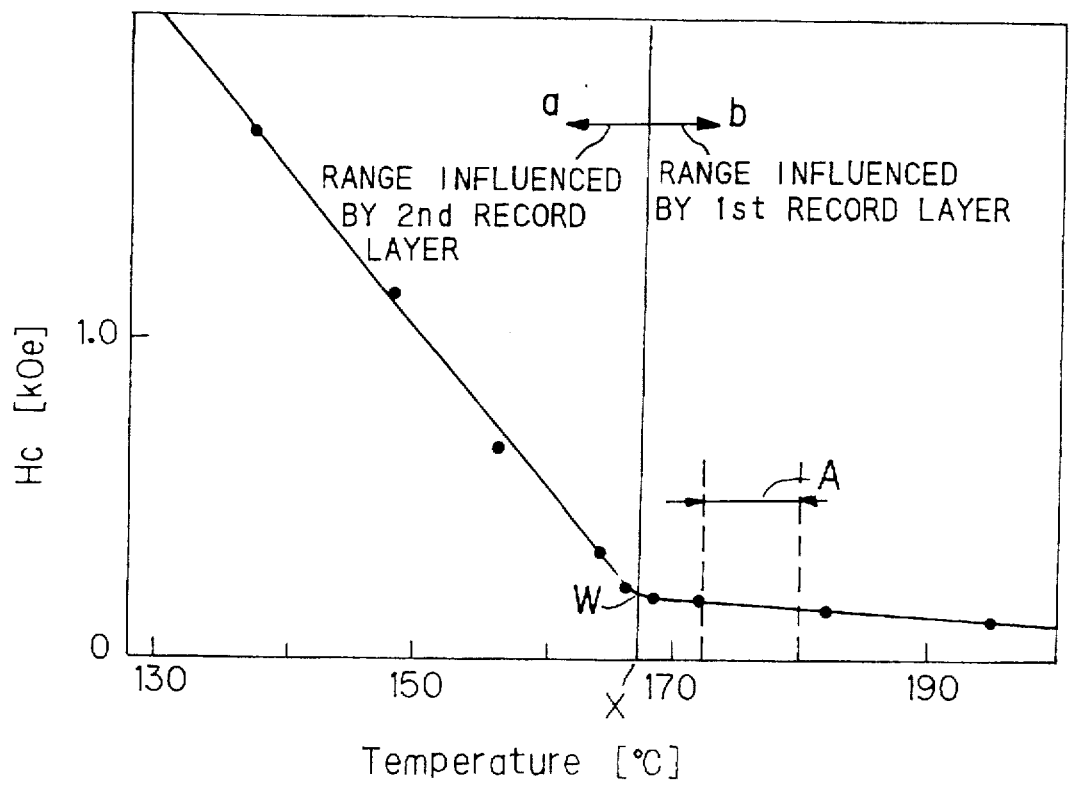
FIG. 2 is a graph for showing a relationship between a temperature and a magnetic coercive force in the magneto optical disc of the embodiment.

In the recording layers (the first recording layer 6 and the second recording layer 7) of the magneto optical disc 1 of the embodiment, a graph showing a relationship between the temperature and the magnetic coercive force has one inflection point W as shown in FIG. 2. In this case, as shown in a symbol a in FIG. 2, in a range of a temperature lower than a temperature X corresponding to the appropriate inflection point W, because of an influence of the second recording layer 7 (whose change of the magnetic coercive force is sharp and the Curie point $T_{CR2}$ is low as compared with the first recording layer 6), the change of the magnetic coercive force of the recording layer of the magneto optical disc 1 is also sharp. As shown in a symbol b of FIG. 2, in a range of a temperature higher than the temperature X corresponding to the appropriate inflection point W, because of the influence of the first recording layer 6 (whose change of the magnetic coercive force is slow (the magnetic coercive force $H_{CR1}$ at the temperature equal to or more than 130° C. is less than 500 oersted) and the Curie point $T_{CR1}$ is high), the change of the magnetic coercive force of the recording layer of the magneto optical disc 1 is slow and is substantially zero.

At a time of recording information by forming the record mark M in the embodiment, the intensity of the light beam B as the recording light is controlled and the recording operation is carried out such that the temperature of the record position on the magneto optical disc 1 in which the record mark M is to be formed has a range A shown in FIG.

2, for the magneto optical disc 1 indicating the above mentioned change of the magnetic coercive force. A detail recording operation is described later.

(III) Apparatus Configuration

Next, a configuration of a magneto optical disc information recording and reproducing apparatus is explained with reference to FIG. 3. The magneto optical disc information recording and reproducing apparatus shown in FIG. 3 can process external record data and form the record mark M in the magneto optical disc 1 by means of the recording operation described later to thereby record information, and further can reproduce the information recorded in the magneto optical disc 1. In the magneto optical disc information recording and reproducing apparatus shown in FIG. 3, the light intensity modulating way is explained as an example.

As shown in FIG. 3, a magneto optical disc recording and reproducing apparatus S according to the embodiment is provided with a spindle motor 10, an optical pickup 11, a RF amplifier 12, a decoder 13, an encoder/decoder 14, a magnetic head 15, a head driving circuit 16, an A/D converter 17, a D/A converter 18, a carriage 19, a servo control circuit 20, a system controller 21, a key input portion 22 and a display 23. The spindle motor 10 rotation-drives the magneto optical disc 1. The optical pickup 11 comprises a laser diode, an actuator and a deflecting beam splitter which are not shown, irradiates to the rotating magneto optical disc 1 the light beam B such as the laser light or the like as the recording light or the reproducing light, and outputs as a RF (Radio Frequency) signal a signal component in the light beam B returned back since the light beam B is reflected on the reproducing layer 4 of the magneto optical disc 1 when a deflection surface is slightly rotated by a magnetic Kerr effect. The RF amplifier 12 amplifies the RF signal up to a predetermined level. The decoder 13 can detect a time position in the magneto optical disc 1 even where the information is not recorded (or when the light beam B is irradiated to a portion in which the record mark M is not formed) by detecting a wobbling frequency from the RF signal. The encoder/decoder 14 extracts a modulation signal corresponding to the record information from the amplified RF signal to thereby demodulate it, and also outputs modulation data corresponding to the record information inputted from an external portion. The magnetic head 15 applies a recording external magnetic field having a constant magnitude described later, to the record position on the first recording layer 6 heated by the light beam B as the recording light modulated corresponding to the information ("0" or "1") to be recorded at the time of recording the information, and forms the record mark M in the appropriate recording layer 6. The head driving circuit 16 drives this magnetic head 15. The A/D converter 17 converts to digital data an analog information signal as the record information inputted from the external portion at the time of recording the information. The D/A converter 18 converts to the analog information signal the digital data that is demodulated and outputted by the encoder/decoder 14 at the time of reproducing the information. The carriage 19 moves the optical pickup 11 to a radial direction of the magneto optical disc 1. The servo control circuit 20 servo-controls the carriage 19 and the actuator (not shown). The system controller 21, which is a controlling means, is composed of a microcomputer and the like for controlling the magneto optical disc information recording and reproducing apparatus S as a whole. The key input portion 22 gives to the system controller 21 a predetermined operation command from the external portion. The display 23 displays necessary information such as information reproduction state and the like.

And, the servo control circuit 20 comprises an APC circuit 20A for controlling a drive current to the laser diode, on the basis of an intensity of the light beam B detected by a monitor photo-diode mounted within the laser diode (not shown) within the optical pickup 11, to thereby set the intensity of the appropriate light beam B to an output power modulated corresponding to the information to be recorded at the time of recording and further maintain at an output power described later at the time of reproducing.

Further, at the time of recording the information, more actually, the intensity of the light beam B is controlled by controlling the APC circuit 20A by means of the system controller 21 such that the intensity of the light beam B becomes an intensity in the recording operation described later.

(IV) Recording Operation

Next, the recording operation in the embodiment is explained with reference to FIGS. 4A to 4E. FIGS. 4A to 4E diagrammatically show how the record mark M is formed and the information is recorded by the recording operation of the embodiment over time. Illustration of the intermediate layer 5, the reproducing layer 4, the substrate 2, the dielectric protecting layers 3 and 8 and the resin protecting layer 9 which do not contribute to the information recording operation is omitted in FIGS. 4A to 4E. Lengths of arrows in respective views of FIGS. 4A to 4E correspond to magnitudes of the magnetizations.

In the embodiment, at first the record mark M is formed in the first recording layer 6, as mentioned above. After that, it is transcribed into the second recording layer 7 at the temperature dropping process, and thereby the appropriate recording mark M is maintained at the room temperature.

At first, prior to recording the information, the magnetization directions of the first recording layers 6 and the second recording layers 7 are aligned in one direction, by continuously irradiating the light having the high power $P_H$ while applying the bias magnetic field $H_b$ in a direction opposite to that at the time of recording, and then the information is erased. More actually, the magnetization directions are all aligned in a downward direction in FIG. 4A.

Figure 4A:
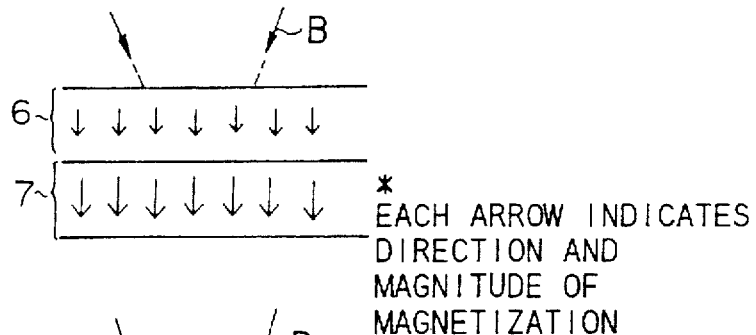
FIGS. 4A to 4E are diagrams for explaining a recording operation.

Next, in the recording operation of the embodiment, at first, as shown in FIG. 4A, the light beam B is irradiated to the record position of the magneto optical disc 1 in which the record mark M is to be formed. Here, since both the first recording layer 6 and the second recording layer 7 are not heated at the beginning of the irradiation of the light beam B, both the magnetic coercive forces are strong, and the magnetization directions are the same direction (downward direction).

At this time, as for the intensity (output power) of the irradiated light beam B, in a case of forming the record mark M corresponding to "1" in the information to be recorded, the appropriate output power is controlled by the APC 20A under the control of the system controller 21 such that a temperature of the appropriate record position to be formed is lower than the Curie point $T_{CR1}$ of the first recording layer 6 and higher than the Curie point $T_{CR2}$ of the second recording layer 7 and more actually becomes a temperature within the range A shown in FIG. 2. The intensity of the light beam B irradiated to a portion in which the record mark M is not to be formed (a portion corresponding to "0" in the information to be recorded) is such that a temperature of the irradiated area is lower than the Curie point $T_{CR2}$ of the second recording layer 7 and a magnetic coercive force at the above mentioned temperature (refer to FIG. 2) is stronger than the recording external magnetic field $H_{exr}$ described later.

Figure 4B:
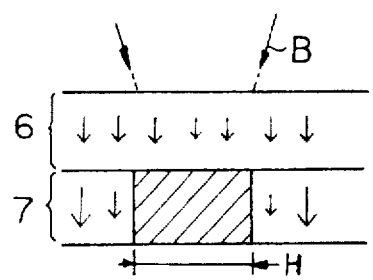

When the light beam B whose output power is modulated corresponding to the information to be recorded as mentioned above, the temperature of the area of the second recording layer 7 corresponding to the area irradiated so as to form the record mark M is equal to or more than the Curie point $T_{CR2}$ of the second recording layer 7 as shown in FIG. 4B. Thus, the magnetization of the appropriate area (shown by a symbol H of FIG. 4B) is lost, and thereby an action of the switched connection force and the like is not performed for the first recording layer 6.

On the other hand, in the first recording layer 6, since the temperature of the appropriate record position is equal to or less than the Curie point $T_{CR1}$ of the first recording layer 6, the magnetization is not lost. However, the more central the portion of the irradiated range of the light beam B, the higher the temperature. Thus, the magnetic coercive force becomes weaker as the appropriate portion approaches the central portion as shown in FIG. 4B (see the lengths of arrows).

Figure 4C:
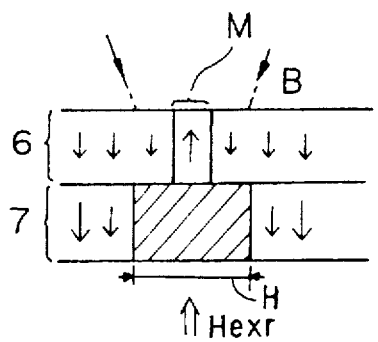

When heated up to a state shown in FIG. 4B by the irradiation of the light beam B, next the recording external magnetic field $H_{exr}$ set to a constant magnitude in a case of forming the record mark M or in a case of not forming it is applied to the record position by the magnetic head 15 as shown in FIG. 4C. The magnitude of the recording external magnetic field $H_{exr}$ at this time is stronger than the magnetic coercive force of the first recording layer 6 corresponding to a temperature of a central portion (a central portion of the irradiation range of the light beam B) of the record position, and in an inside of a boundary line of an area of the first recording layer 6 corresponding to an area of the second recording layer 7 (refer to a symbol B of FIG. 4C) in which the magnetization is lost, is weaker than the magnetic coercive force of the first recording layer 6 at a temperature at the vicinity of the appropriate boundary line. Actually, it is set to a value stronger than the magnetic coercive force of the first recording layer 6 corresponding to the temperature of the central portion of the record position and a value at the vicinity of the magnetic coercive force of the appropriate first recording layer 6, and is more actually set to a value from approximate 200 to 300 oersted. When the recording external magnetic field $H_{exr}$ having this magnitude is applied, only the magnetization direction at the central portion of the record position within the first recording layer 6 becomes the direction of the applied recording external magnetic field $H_{exr}$, and thereby the record mark M as shown in FIG. 4C is formed by this change of the magnetization.

In this case, a size of the record mark M is smaller than that of the area of the second recording layer 7 in which the magnetization is lost.

Figure 4D:
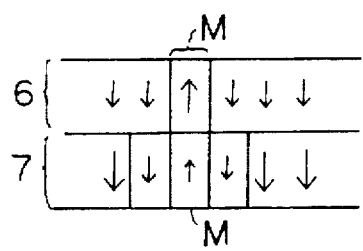

Next, when the record mark M is formed in the first recording layer 6, the irradiation of the light beam B to the record position is stopped due to the rotation of the magneto optical disc 1, and thereby the temperature of the appropriate record position is reduced. Then, as shown in FIG. 4D, the magnetic coercive force of the first recording layer 6 is increased for some time, and also the temperature of the second recording layer 7 becomes lower than the Curie point $T_{CR2}$ of the appropriate second recording layer 7. Thus, the magnetization appears in the appropriate second recording layer 7. At this time, since the magnetization of the first recording layer 6 acts on the second recording layer 7 as an external magnetic field, the magnetization also appears in the second recording layer 7 at the same state as the first recording layer 6, to thereby form the record mark M similar to that formed in the first recording layer 6.

Figure 4E:
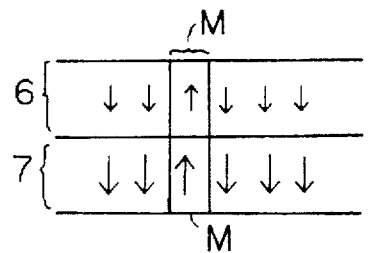

And, when the temperature is further reduced, the magnetic coercive force of the second recording layer 7 becomes stronger than that of the first recording layer 6, as shown in FIG. 4E. Accordingly, the record marks M are maintained in the first recording layer 6 and the second recording layer 7 without the loss of the record mark M even at the room temperature, and thereby the information is recorded.

In a case of not forming the record mark M, although the recording external magnetic field $H_{exr}$ having the above mentioned magnitude is continuously applied, the output power of the light beam B at that time is such a magnitude, as mentioned above, that the temperature of the irradiated area is lower than the Curie point $T_{CR2}$ of the second recording layer 7 and the magnetic coercive force at that temperature (refer to FIG. 2) is stronger than the recording external magnetic field $H_{exr}$. Thus, the magnetization of the second recording layer 7 is not inverted, and it is kept at an initialized state. As a result, since the temperature is reduced at that situation, the magnetization of the second recording layer 7 is also transcribed into the first recording layer 6, and the record mark is not formed.

Next, in the embodiment, in a case where the output power of the light beam B is changed at the time of forming the record mark M, that is, in a case where a temperature of the record position (hereafter, referred to as a record temperature) is changed, a change of the record mark M is explained with reference to FIGS. 5 and 6.

Figure 5:
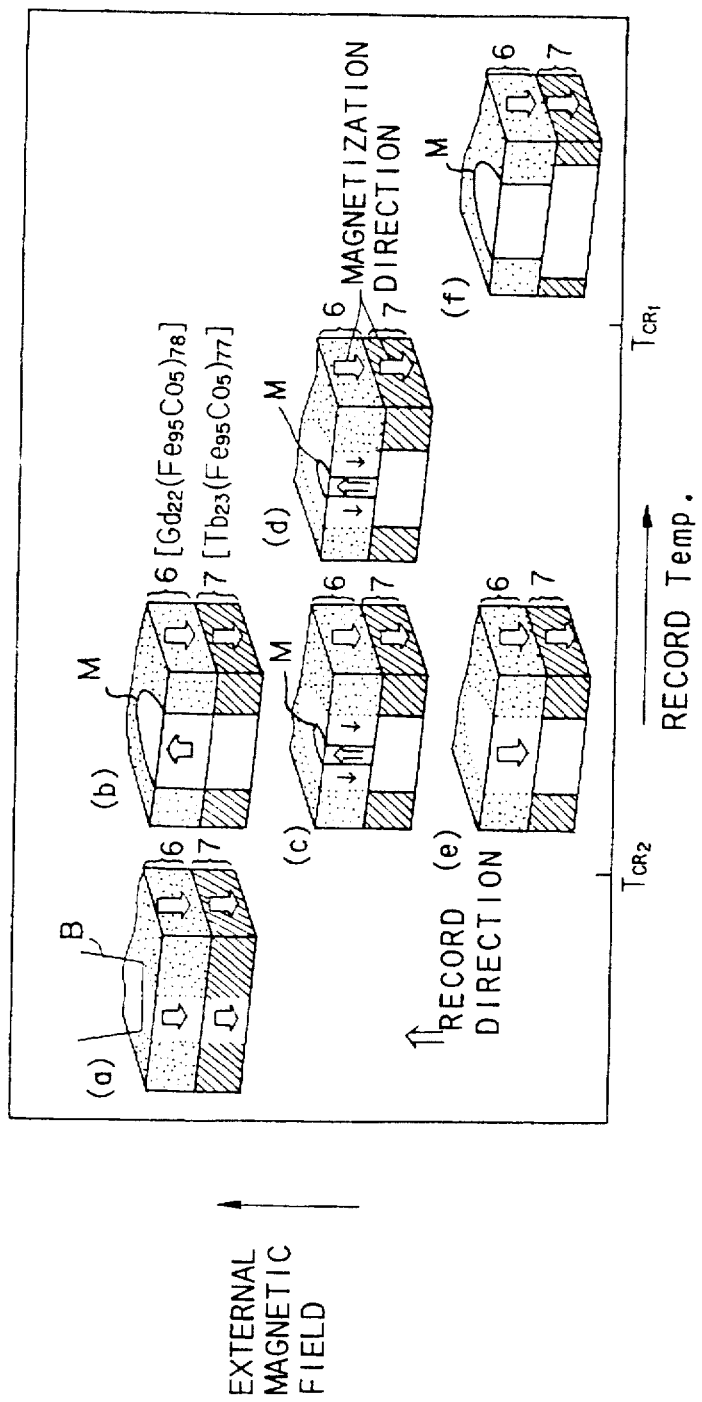
FIG. 5 is a diagram for showing a relationship between a variation of a record temperature and a size of a record mark.

Each of cases (a) to (f) in a graph of FIG. 5 shows the magnetization direction in each of the recording layers, namely, a forming situation of the record mark M, when a horizontal axis indicates the change of the record temperature and a vertical axis indicates the change of the magnitude of the recording external magnetic field $H_{exr}$. FIG. 6 is a graph showing a relationship between the output power of the light beam B at the time of recording (Recording Power) and a gain in the reproducing RF signal, and illustrates, by using each of symbols (a) to (f), a portion corresponding to the relationship between the output power of the light beam B at the time of recording and the gain, in a case of reproducing the record information of the magneto optical disc 1 in which the above mentioned recording operation is carried out under the record temperature corresponding to each cases (a) to (f) and the recording external magnetic field $H_{exr}$. In the graph of FIG. 6, the magnitude of the recording external magnetic field $H_{exr}$ is a parameter, and further the gain of the vertical axis can be replaced with the size of the record mark M as it is.

At first, the case (a) in FIG. 5 shows an original state. Since, the record position is not sufficiently heated, the record mark M is not formed, and the gain is substantially zero also in FIG. 6. That is, the case (a) in FIG. 5 corresponds to FIG. 4A.

Next, the cases (c) and (d) correspond to the forming of the record mark M according to the embodiment, and both of them correspond to FIG. 4C. The magnitude of the recording external magnetic field $H_{exr}$ at this time ranges from approximate 200 to 300 oersted.

In each cases (c) and (d) in FIG. 5, the temperature of the record position is a temperature between the Curie point $T_{CR1}$ of the first recording layer 6 and the Curie point $T_{CR2}$ of the second recording layer 7, and the magnetization of the second recording layer 7 is lost. Thus, since there is no influence of the magnetic field from the second recording layer 7, the record mark M, whose size is smaller than that of the area where the magnetization of the second recording layer 7 is lost as mentioned above, is formed in the first recording layer 6.

When comparing the case (c) with the case (d) in FIG. 5, although the case (d) is higher in the record temperature, the change of the magnetic coercive force to that of the temperature in the first recording layer 6 is extremely small as mentioned above. Thus, the change of the magnetic coercive force is small even if the record temperature is increased, and thereby an area in which the magnetic coercive force becomes weak is not spread. Therefore, if the magnitude of the recording external magnetic field $H_{exr}$ is same, even if the record temperature is changed, the size of the record mark M is not substantially changed. That is, in each of the cases (c) and (d), even if the record temperature is varied, the size of the record mark M is not changed. This fact corresponds to a fact that in FIG. 6, the gain of the position shown in each of the symbols (c) and (d) is not substantially changed irrespective of the variation of the output power of the light beam B.

The case (b) is a case where the external magnetic field is stronger than that of the cases (c) and (d), and actually shows a case in which it is equal to or more than 500 oersted. In this case, since the magnetic coercive force of the first recording layer 6 is less than 500 oersted at the range of the temperature equal to or more than 130° C. as mentioned above, the entire range which does not receive the influence of the magnetization of the second recording layer 7 is aligned in the direction of the recording external magnetic field $H_{exr}$, so that the size of the record mark M becomes the same size as that of the area of the second recording layer 7 in which the magnetization is lost. Accordingly, the record mark M larger than that of the cases (c) and (d) in FIG. 5 is formed. This fact corresponds to a fact that in FIG. 6, a gain of a position illustrated by a symbol (b) is larger than a gain of a position illustrated by a symbol (c) or (d).

The case (e) is a case where the recording external magnetic field $H_{exr}$ is weaker than that of the cases (c) and (d), and actually shows a case in which it is less than 100 to 200 oersted. In this case, since the magnetization of the second recording layer 7 is lost, there is no influence from the second recording layer 7. However, since the recording external magnetic field $H_{exr}$ is weaker than the magnetic coercive force of the first recording layer 6 corresponding to the temperature of the central portion of the record position, the magnetization direction of the first recording layer 6 of the record position is not aligned in the direction of the recording external magnetic field $H_{exr}$, and the record mark M is not formed. This fact corresponds to a fact that a gain of a position illustrated by a symbol (e) of FIG. 6 is substantially zero.

Further, the case (f) is a heated case where the record temperature is equal to or more than the Curie point $T_{CR1}$ of the first recording layer 6, and shows a case corresponding to the aforementioned prior art.

In this case, since the magnetizations of the first recording layer 6 and the second recording layer 7 are perfectly lost, the record mark M corresponding to a size of an area in which the magnetization is lost is formed even by a weak recording external magnetic field $H_{exr}$ at the temperature dropping process. A size of the record mark M at this time is larger than that of the cases (c) and (d) in FIG. 5. This fact corresponds to a fact that a gain of a position illustrated by a symbol (f) of FIG. 6 is higher than the gain of the position illustrated by the symbol (c) or (d) even if a weak external magnetic field.

Next, an application of the embodiment in a case of changing the composition of the second recording layer 7 is explained with reference to FIGS. 7A to 7C. Here, each of FIGS. 7A to 7C shows a relationship between the output power of the light beam B and the gain in the reproducing RF signal, in a case where the above mentioned recording operation is carried out by using three kinds of the magneto optical discs 1 in which an element ratio of terbium (Tb) is changed among elements constituting the second recording layer 7. Similarly to FIG. 6, a gain of a vertical axis can be replaced with a size of a record mark M as it is. With respect to the other element composition in the second recording layer 7 and the composition of the first recording layer 6, the first recording layer 6 is $Gd_{24}(Fe_{95}Co_5)_{76}$, and the second recording layer 7 is $Tb_x(Fe_{95}Co_5)_{100-x}$.

Figure 6:
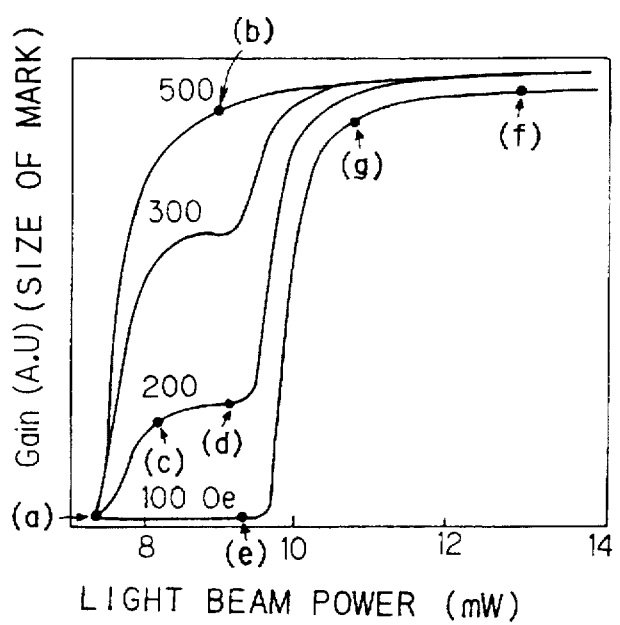
FIG. 6 is a graph for showing a relationship between an output power of a light beam and a size of a record mark.

As shown in FIGS. 7A to 7C, a performance similar to that of FIG. 6 is obtained when the element ratios of the terbium are 23 [at %] and 24 [at %] (shown in FIGS. 7A and 7B) in the second recording layer 7. A record mark M smaller than that of the prior art is formed at a stair-shaped portion of the graph. And, a size of the record mark M is not changed in the appropriate stair-shaped portion (generally, a portion in which the output power of the light beam B ranges from 8.5 mW to 9.5 mW) even if the output power of the light beam B is changed.

However, in a case where the element ratio of the terbium is 25 [at %] (shown in FIG. 7C), the above mentioned stair-shaped portion does not appear. That is, the record mark M is not formed even if the output power of the light beam B and the recording external magnetic field $H_{exr}$ are set to the same condition as the case in which the element ratio of the terbium is 23 [at %] or 24 [at %].

This reason is explained below. That is, in a case where the element ratio of the terbium is 25 [at %], a compensation temperature $T_{COMP}$ in the second recording layer 7 exceeds 100° C. Thus, the record mark M formed in the first recording layer 6 is not transcribed into the second recording layer 7 in the recording operation. And, since the magnetic coercive force of the first recording layer 6 itself is weak at the room temperature, even if the record mark M is once formed in the first recording layer 6, it is lost. At last, the record mark is not maintained.

The reason why the record mark M in the embodiment is not formed when the compensation temperature $T_{COMP}$ in the second recording layer 7 is not within a range from the room temperature to 100° C. (the record mark M is not transcribed from the first recording layer 6 to the second recording layer 7) is explained below. That is, when the element ratio of the terbium in the second recording layer 7 is equal to or more than 25 [at %], the compensation temperature $T_{COMP}$ in the appropriate second recording layer 7 exceeds 100° C. and approaches the Curie point $T_{CR2}$ thereof. Then, when the record mark M formed in the first recording layer 6 is transcribed into the second recording layer 7, the transcribing operation between the two layers becomes weak. At a transcribed temperature, the first recording layer 6 is in a TM-rich state (i.e. a state in which a partial magnetization of a transition metal element is stronger than that of a rare earth metal element), and the second recording layer 7 is in a RE-rich state (i.e. a state in which the partial magnetization of the rare earth metal element is stronger than that of the transition metal element). Thus, a boundary magnetic wall is generated between the two layers, and the record mark M which is formed in a small size on the first recording layer 6 is not transcribed into the second recording layer 7.

The above mentioned reason requires the second recording layer 7 to be a magnetic film in which the compensation temperature $T_{COMP}$ ranges from the room temperature to 100° C.

As explained above, according to the recording operation of the embodiment, the output power of the light beam B is controlled such that the record temperature is between the Curie point $T_{CR1}$ of the first recording layer 6 and the Curie point $T_{CR2}$ of the second recording layer 7, and further the magnitude of the recording external magnetic field $H_{ext}$ is set to a value from approximate 200 to 300 oersted. As a result, it is possible to form the record mark M smaller than that of the prior art to thereby record the information.

Furthermore, even if the output power of the light beam B is changed at the time of forming the record mark M, since the size of the record mark M is not changed, it is possible to stably form the record mark M. As a result, it is possible to make a margin (an allowable range) larger for the variation of the output power of the light beam B.

In the above mentioned embodiment, the case is explained in which the present invention is applied to the light intensity modulation way. However, the present invention is not limited to it. It is possible to apply to the information record by means of the magnetic field modulation way. In this case, the output power of the light beam B is constant at the output power at the time of forming the record mark M in the explanation of the record operation. Further, the magnitude of the recording external magnetic field $H_{ext}$ is the above mentioned magnitude. The magnetization direction is modulated corresponding to the information to be recorded ("0" or"1"). The magnetization direction of the recording external magnetic field $H_{ext}$ is more actually upward in the area (timing) corresponding to "1" in the information to be recorded, and downward in the area (timing) corresponding to"0" in the information to be recorded. Accordingly, the record marks M are formed in the first recording layer 6 and the second recording layer 7 by the upward magnetization, and thereby the information is recorded.

(V) Reproducing Operation

Next, a reproducing operation of reproducing, from the magneto optical disc 1 which the record mark M is formed in and the information is recorded to by the above mentioned recording operation, the appropriate information is explained with reference to FIGS. 8 and 9. Illustration of the substrate 2, the dielectric protecting layers 3 and 8 and the resin protecting layer 9 which do not contribute to the information reproducing operation is omitted in FIG. 8. A super resolution reproduction using a so-called FAD way (Forward Aperture Detection) is carried out in the reproducing operation using the magneto optical disc 1.

In the reproducing operation, at first the light beam B as the reproducing light is irradiated to the magneto optical disc 1 to which the information is recorded. The output power of the light beam B at this time is controlled in such a way that a reproducing temperature in the light spot BP formed by the irradiation of the light beam B is higher than the Curie point $T_{CS}$ of the intermediate layer 5 and lower than the Curie point $T_{CP}$ of the reproducing layer 4 and when the reproducing external magnetic field $H_{exp}$ is applied at the appropriate reproducing temperature, the magnetic coercive force of the reproducing layer 4 is made weak to the extent that the magnetization direction of the reproducing layer 4 is aligned in the reproducing external magnetic field $H_{exp}$.

When the light beam B whose output power is controlled as mentioned above is irradiated, a temperature within the light spot BP is increased. At this time, the magneto optical disc 1 itself is rotated in a direction shown in FIG. 8. As a result, as shown in a plan view of FIG. 8, a mask area $A_M$ in which the reproducing temperature is higher than the Curie point $T_{CS}$ of the intermediate layer 5 and lower than the Curie point $T_{CP}$ of the reproducing layer 4 appears in a rear portion of the light spot BP for a rotation direction of the magneto optical disc 1. In this mask area $A_M$, as shown in a section view of FIG. 8, when a temperature of the intermediate layer 5 becomes equal to or more than the Curie point $T_{CS}$, the magnetization is lost, and thereby the switched connection force between the first recording layer 6 and the reproducing layer 4 is lost.

Next, when a reproducing external magnetic field $H_{exp}$ (for example, a magnitude of approximate 300 oersted) stronger than the magnetic coercive force of the heated reproducing layer 4 is applied to the heated mask area $A_M$ by the magnetic head 15, the magnetization direction of the reproducing layer 4 is aligned in a direction of the applied reproducing external magnetic field $H_{exp}$, the record mark M is lost, and thereby the information can not be read out at the mask area $A_M$. At this time, the reproducing external magnetic field $H_{exp}$ is applied at a magnitude weaker than the magnetic coercive forces of the first recording layer 6 and the second recording layer 7 corresponding to the heated mask area $A_M$. Since this mask area $A_M$ exists, the information corresponding to the record mark M is read out only from the area other than the mask area $A_M$ within the light spot BP. As a result, it is possible to carry out the so-called super resolution reproducing operation for reproducing the information recorded by the record mark M having a size exceeding a spatial frequency of the light beam B.

When the magneto optical disc 1 is further rotated, a temperature of the mask area $A_M$ is reduced, and the magnetization of the intermediate layer 5 appears again. Thus, the record mark M formed in the first recording layer 6 is again transcribed into the reproducing layer 4, and the original record mark M is again formed in the reproducing layer 4.

Next, the reproducing RF signal reproduced actually by the above mentioned reproducing operation is explained with reference to FIG. 9.

Figure 9A:
FIG. 9 is a graph for showing a relationship between the output power of the light beam and a wave form of a reproducing RF signal.
Figure 9B:
Figure 9C:
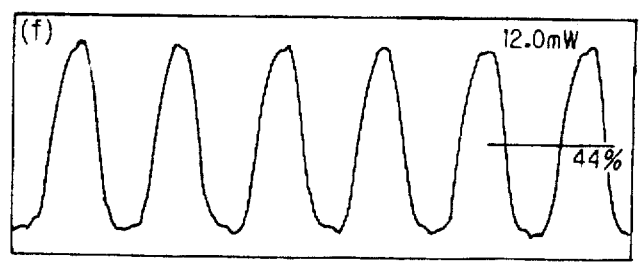

Here, FIG. 9 compares levels of the reproducing RF signals when reproducing the magneto optical disc 1 to which the information is recorded under the condition of the output power and the recording external magnetic field $H_{ext}$ corresponding to the symbols (c), (g) and (f) in FIG. 5 or 6.

As can be understood from FIG. 9, in a case (corresponding to the symbol (c)) where the record temperature lower than that of the prior art (the output power is made weak) is, the level itself of the reproducing RF signal is lower than that of a case (corresponding to the symbol (g) or (f)) in which the record temperature is higher than the Curie point $T_{CR1}$ of the first recording layer 6. However, it is possible to surely obtain the reproducing RF signal corresponding to the record mark M to thereby reproduce the information. This means that according to the recording operation of the embodiment, it is possible to surely form the record mark smaller than that of the prior art to thereby record the information by means of the smaller record mark.

In the above mentioned explanation of the reproducing operation, the super resolution reproducing operation of the FAD way is explained. However, the application of the present invention is not limited to it. It is possible to carry out a super resolution reproducing operation of a so-called RAD way (Rear Aperture Detection) by using the magneto optical disc 1 to which the information is recorded by the present invention. In this case, when the magnetization directions of the reproducing layer 4 and the intermediate layer 5 shown in FIG. 1 are aligned in a downward direction and a predetermined reproducing magnetic field is applied at a time of reproducing, the recording magnetizations of the first recording layer 6 and the second recording layer 7 are transcribed into the reproducing layer 4 and the intermediate layer 5, and thereby the super resolution reproducing operation is possible.

As explained above, according to this embodiment, the record mark M is formed under such a condition that the magnetization of the first recording layer corresponding to a smaller range than an area of the first recording layer 6 corresponding to an area of the second recording layer 7 in which the magnetic coercive force $H_{CR2}$ is zero is the direction of the recording external magnetic field $H_{ext}$, and thereby the record information is recorded, and the appropriate record mark M is transcribed into the second recording layer 7 and kept there. Thus, as compared with a case in which the temperature of the record position is higher than the Curie point $T_{CR1}$ and the Curie point $T_{CR2}$ so that the magnetizations of the first recording layer 6 and the second recording layer 7 are lost, the recording external magnetic field is applied to the appropriate record position at the temperature dropping process and thereby the information is recorded, it is possible to make the size of the record mark M smaller. Further, it is possible to stably reproduce the record information corresponding to the appropriate record mark M by using the FAD way or the RAD way.

Furthermore, since a changing rate of the magnetic coercive force $H_{CR1}$ in a predetermined temperature range is within a predetermined range, even if the output power of the recording light is varied, variation of an area size (the size of the record mark M) is little in which the magnetization direction in the first recording layer 6 becomes the direction of the external magnetization. As a result, it is possible to form the record mark M with a stable size even if the output power of the recording light is varied.

The present invention may be embodied in other specific forms without departing from the spirit or essential characteristics thereof. The present embodiment is therefore to be considered in all respects as illustrative and not respective, the scope of the invention being indicated by the appended claim rather than by the foregoing description and all changes which come within the meaning and range of equivalency of the claim are therefore intended to be embraced therein.

What is claimed is:

1. An information recording method of recording record information to a magneto optical disc comprising at least first and second recording layers such that the record information is recorded to said first recording layer at a vertically magnetized state thereof and is also recorded to said second recording layer at a vertically magnetized state thereof, said first recording layer having a first magnetic coercive force, whose changing rate in a predetermined temperature range is within a predetermined rate range, and also having a first Curie point, said second recording layer having a second magnetic coercive force, whose changing rate is larger than that of said first magnetic coercive force in said predetermined temperature range and which is stronger than said first magnetic coercive force at a room temperature, and also having a second Curie point, which is lower than said first Curie point, said method comprising the steps of:

controlling an output power of a recording light such that a temperature of a record position, to which the record information is to be recorded, on said magneto optical disc becomes a predetermined record temperature higher than said second Curie point and lower than said first Curie point;

irradiating the recording light, whose output power is controlled by said controlling step, to said record position; and applying, while irradiating the recording light to said magneto optical disc, to said record position, an external magnetic field, which is stronger than said first magnetic coercive force corresponding to said predetermined record temperature and is weaker than said first magnetic coercive force corresponding to a temperature inside and at the vicinity of a boundary line of an area of said first recording layer corresponding to an area of said second recording layer in which said second magnetic coercive force is zero because of an irradiation of the recording light, so as to form a record mark corresponding to the record information by aligning a direction of magnetization remaining in said first recording layer into a direction of the external magnetic field.

2. A method according to claim 1, further comprising the step of modulating the output power in accordance with the record information to be recorded.

3. A method according to claim 2, wherein, in the controlling step, the output power of the recording light is controlled such that a temperature of a non-record position, to which the record mark is not to be formed, becomes a predetermined non-record temperature lower than said second Curie point and that said second magnetic coercive force corresponding to said predetermined non-record temperature is stronger than the external magnetic field.

4. A method according to claim 1, further comprising the step of modulating the external magnetic field in accordance with the record information to be recorded.

5. A method according to claim 4, wherein the external magnetic field is modulated such that the direction of the external magnetic field is changed to either one of a first direction perpendicular to a plane of the magneto optical disc and a second direction opposite to the first direction in accordance with the record information to be recorded.

6. A method according to claim 1, further comprising the step of erasing the record mark by applying a bias magnetic field whose magnetic direction is opposite to that of the external magnetic field before irradiating the recording light.

7. An information recording apparatus for recording recorded information to a magneto optical disc comprising at least first and second recording layers such that the record information is recorded to said first recording layer at a vertically magnetized state thereof and is also recorded to said second recording layer at a vertically magnetized state thereof, said first recording layer having a first magnetic coercive force, whose changing rate in a predetermined temperature range is within a predetermined rate range, and also having a first Curie point, said second recording layer having a second magnetic coercive force, whose changing rate is larger than that of said first magnetic coercive force in said predetermined temperature range and which is stronger than said first magnetic coercive force at a room temperature, and also having a second Curie point, which is lower than said first Curie point, said apparatus comprising:

an output power controller for controlling an output power of a recording light such that a temperature of a record position, to which the record information is to be recorded, on said magneto optical disc becomes a predetermined record temperature higher than said second Curie point and lower than said first Curie point;

a light irradiation means for irradiating the recording light, whose output power is controlled by said output power controller, to said record position; and a magnetic field applying means for applying, while said light irradiation means irradiating the recording light to said magneto optical disc, to said record position, an external magnetic field, which is stronger than said first magnetic coercive force corresponding to said predetermined record temperature and is weaker than said first magnetic coercive force corresponding to a temperature inside and at the vicinity of a boundary line of an area of said first recording layer corresponding to an area of said second recording layer in which said second magnetic coercive force is zero because of an irradiation of the recording light, so as to form a record mark corresponding to the record information by aligning a direction of magnetization remaining in said first recording layer into a direction of the external magnetic field.

8. An apparatus according to claim 7, wherein said output power controller modulates the output power in accordance with the record information to be recorded.

9. An apparatus according to claim 8, wherein said output power controller controls the output power such that a temperature of a non-record position, to which the record mark is not to be formed, becomes a predetermined non-record temperature lower than said second Curie point and that said second magnetic coercive force corresponding to said predetermined non-record temperature is stronger than the external magnetic field.

10. An apparatus according to claim 7, wherein said magnetic field applying means modulates the external magnetic field in accordance with the record information to be recorded.

11. An apparatus according to claim 10, wherein said magnetic field applying means modulates the external magnetic field such that the direction of the external magnetic field is changed to either one of a first direction perpendicular to a plane of the magneto optical disc and a second direction opposite to the first direction in accordance with the record information to be recorded.

12. An apparatus according to claim 7, wherein said output power controller comprises an APC (Automatic Gain Control) circuit.

* * * * *